July 19, 1960 M. A. POWERS 2,945,557
FLUID FILTERING MEDIUMS
Filed Dec. 12, 1957

INVENTOR
MILTON A. POWERS

BY
ATTORNEYS

United States Patent Office 2,945,557
Patented July 19, 1960

2,945,557

FLUID FILTERING MEDIUMS

Milton A. Powers, 655 Bedford Lane, Grosse Pointe, Mich.

Filed Dec. 12, 1957, Ser. No. 702,305

10 Claims. (Cl. 183—51)

This invention relates to improved fluid filtering mediums and more particularly to filter mediums of the type comprising a screen having a fibrous flock material adhesively secured thereto. The filter medium of this invention may be used to filter either gases, vapors or liquids.

Filter mediums comprising a screen having short fibrous flock material randomly attached thereto have been known in the art for quite some time. Filters of this general type have certain inherent limitations and disadvantages, one of the most important being lack of depth in filtering action resulting from the relatively fine mesh screen and short lengths of fibers customarily used. Attempts to increase the depth of filtering action have been made by providing two or more of such flocked screens adjacent each other. Such arrangements have not proved satisfactory because the outer retaining surface of the first filter screen is so lacking in depth that the short fluid passageways therethrough are quickly clogged with dirt or other material being filtered. This materially shortens the useful span of the filtering medium, at the end of which time it must be either cleaned or replaced.

An object of this invention is to provide an improved fluid filtering medium of increased depth comprising a corrugated screen having furrows therein filled with individual fibers of a flocking material.

Another object of this invention is to provide a novel fluid filtering medium construction wherein a desired depth of filtering action may be readily provided through a flocked corrugated screen, the depth of the filtering action being directly proportional to the depth of corrugation made in the screen.

Other objects and advantages of the invention will become apparent from the following detailed description and drawing, in which.

Figure 1:
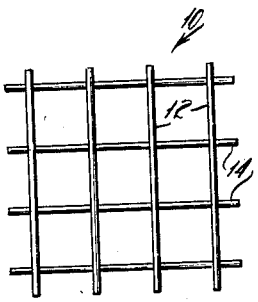
Figure 1 is a top plan view of a flat screen used in the construction of the filtering medium of this invention.

Referring now more specifically to the drawings, there is illustrated in Figure 1 a plan view of a section of a relatively rigid metal wire screen 10 comprising vertical wires 12 which are cross-laid on horizontal wires 14. The intersections of the wires 12 and 14 are preferably welded exactly to true dimensions to facilitate forming of corrugations to be described hereinafter; however, they may be secured in other conventional manners as by dip-galvanizing and the like. It is to be understood of course that the screen may be formed in any other well-known manner such as weaving, braiding, etc. and may be of other suitable materials such as synthetic plastics and the like.

Figure 2:
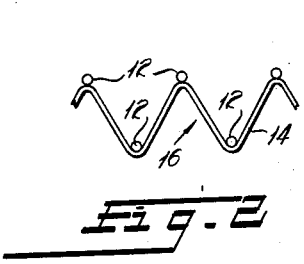
Figure 2 is a side elevation of the screen of Figure 1 after it has been corrugated.

Referring now to Figure 2, there is shown the screen 10 after it has been corrugated to form furrows 16 in opposite sides of the screen which provide strength and rigidity in the ultimate novel fluid filtering medium that is to be made therefrom. The corrugations may be formed in the screen by folding or pleating wires 14 at points where they intersect with wires 12 and then pulling opposite sides of the screen adjacent the ends of wires 14 outwardly a sufficient amount to form the furrows 16 at a desired width and depth. Thus it is readily apparent that by proper selection of screen mesh size and the points where the folds are made, any desired final dimension as to depth and width of furrows 16 may be obtained.

Figure 3:
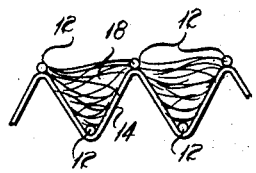
Figure 3 is a side elevation of a filtering medium of this invention illustrating the corrugated screen of Figure 2 after the furrows therein have been randomly filled with a fibrous flocking material.

One embodiment of this invention resides in coating the screen 10 with a suitable adhesive (not shown) and randomly filling the furrows 16 in screen 10 with a selected flock material having long fibers 18 as shown in Figure 3, which may be applied by an air hose or other suitable blowing means. As the fibers 18 are applied, the first fibers blown against the screen lie deep in the furrows 16 and then build up loosely or densely as desired, depending upon the rate and the force at which they are applied, until the entire furrow is filled. There is some end attachment of the fibers to the screen but a majority lie across more than one wire forming the body of screen 10 and hence are securely attached thereto. For example, in a ½" mesh screen it is preferred that the fibers be about ¾" in length so that the fibers also lie across the furrows 16 as well as more than one wire. In general it has been found that excellent results are obtained with screens having meshes as large as two inches and as small as eight meshes per inch; and flocking materials such as rayon, saran, nylon, wool, cotton, acetate, polyethylene, etc. having suitable fiber lengths in accordance with the size of screen mesh and the embodiment of invention made as will be apparent hereinafter.

Figure 4:
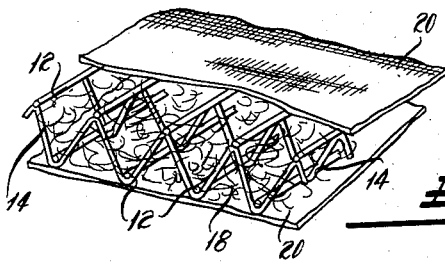
Figure 4 is a perspective view of a portion of a filtering medium illustrating another embodiment of this invention wherein the corrugated screen of Figure 2 has the furrows on both sides thereof filled with a fibrous flocking material and outer surfaces of the medium are covered with a woven plastic cloth.

Referring now to Figure 4, there is shown the flocked screen of Figure 3 with the furrows 16 on the opposite side thereof filled with long fibers 18 in the same manner as described above. In addition, opposite sides of the filtering medium so formed are covered with a cloth or screen 20 having considerably smaller meshes than the meshes in screen 10. For example, with screen 10 having meshes of about ½", screen 20 may have meshes of about ¹⁄₁₆". However, a wide range of mesh may be preferred, depending upon the many various applications to which the filtering mediums of this invention are suitable. The screen 20 may be of any suitable material such as a woven plastic cloth of polyethylene, rayon, or like materials, and also may be a metallic screen uncoated or with plastic coating or flocking. This filtering medium assembly of Figure 4, as well as the others illustrated and described herein, may be edge-sealed in a suitable frame such as aluminum, or left open, or further protected by an outer screen, or any number of variations which will be apparent to anyone familiar with the art.

Figure 5:
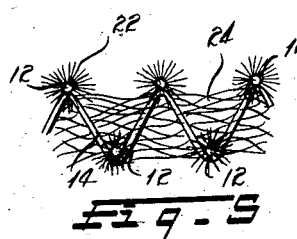
Figure 5 is a side view of the corrugated screen of Figure 2 after it has been flocked in a particular manner wherein fibers are attached endwise to the screen and furrows in the screen are randomly filled with long fibers.

Referring now to Figure 5, there is illustrated another embodiment of this invention wherein the screen 10 is covered with relatively short flock fibers 22 of about 1/8" to 1/4" in length which are electrostatically attached endwise to the screen either before or after the corrugations are formed therein. After the screen 10 is corrugated, the furrows therein are then randomly filled with a relatively long flock material 24 such as 3/4" in the same manner as long fibers 18 were applied in forming the assemblies illustrated in Figures 3 and 4. It is preferred that the flocked and corrugated screen be given a preliminary recoating of a thin clear adhesive before the long fibers 24 are applied whereby they are tightly secured to the shorter fibers 22.

Figure 6:
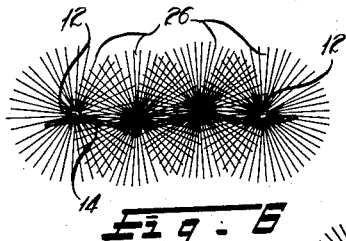
Figure 6 is a side view of the screen of Figure 1 after it has been flocked with long fibers which are attached endwise thereto.
Figure 7:
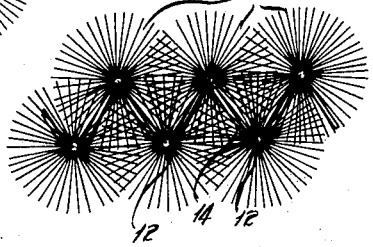
Figure 7 is a side view of the flocked screen of Figure 6 after it has been corrugated to form still another embodiment of this invention.
Figure 9:
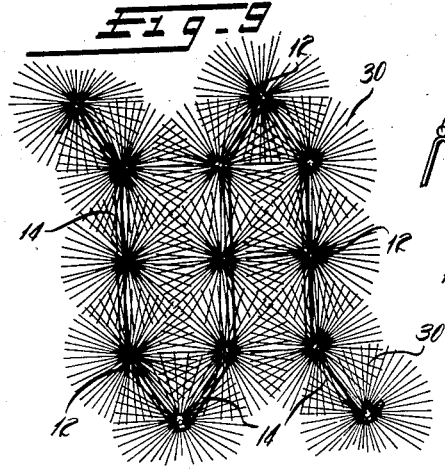
Figure 9 is a side view of an endwise flocked screen as shown in Figure 6 after it has been corrugated in a manner similar to Figure 8 but having deeper furrows.

Referring now to Figure 6, there is illustrated a screen flocked in a different manner and used in forming still another embodiment of the invention. Here long fibers of flock 26 of about 1/2" in length are electrostatically attached endwise to the screen 10 shown in Figure 1. In this embodiment it is preferred that the minimum length of the fibers be at least one half the maximum dimension of the mesh opening. At this length, a tortuous fluid path is provided through all portions of the filtering medium by the overlapping of fibers resulting from the endwise attachment. By increasing the length of the fibers as shown, there is substantial overlapping adjoining the mesh openings providing uniformly narrowing tortuous fluid paths whereby an increase in effective filtering action is achieved. The amount of overlapping of course increases as the length of the fibers is increased. The screen 10 having the long fibers 26 attached endwise thereto is then corrugated to form the structure as shown in Figure 7 whereby overlapping occurs between alternating rows as illustrated. Thus it is readily seen that this increased overlapping of the ends of fibers 26 provides a filtering medium of greatly increased depth over that which is possible with a conventional flat screen having short matted fibers thereon or short endwise attached fibers. The fibers 26 may be applied either before or after the screen 10 is corrugated, however, it is preferred that in endwise attachment of fibers they be applied before the screen is corrugated so that a more uniform distribution at points of attachment to the screen is achieved. This becomes more important as the depth of furrows is increased and the width is not increased proportionately as shown in the embodiment of Figure 9 to be described hereinafter.

Figure 8:
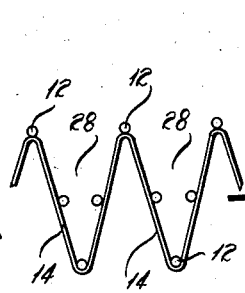
Figure 8 is a side view of the screen of Figure 1 after it has been corrugated in a particular manner to be used in forming still another embodiment of this invention.

Referring now to Figure 8, there is shown another form of corrugation in the screen 10 whereby furrows 28 of any desired depth may be formed. In this embodiment, the alternating folds or pleats forming the corrugations are made in wires 14 at any selected number or spacing of wires 12 as for example, in this illustration, a fold being made at every third wire. The furrows 28 so formed may be made even deeper if desired as shown in Figure 9 wherein the folds forming the corrugations in the screen are made at every fifth wire. The furrows so formed are narrow enough throughout their depth that there is substantial overlapping at the center of the furrow of the ends of fibers mounted on opposite sides of the furrow. The increased filtering action that results from the increased depth or length of tortuous paths through which the fluid must pass is obvious from the filtering medium illustrated wherein fibers 30 are secured in exactly the same manner as shown in Figure 6. Instead of having all endwise attached long fibers forming the filtering medium as shown in Figures 6 and 9, respectively, an alternative construction is to increase the outer width of the furrows in the screen so that there is no overlapping in this space which may then be filled with randomly applied fibers to form a construction similar to that of Figure 5.

Endwise attachment of both the long and short fibers in the embodiments described above is accomplished by an electrostatic charge thereon as they are blown by a circulating air stream against the screen. The fibers are preferably stiff enough to be self-supporting. The screen is either grounded or supplied with an electrostatic charge opposite to the electrostatic charge on said fibers so that as the fibers approach the screen, they will so position themselves by the attractive force between the screen and fibers that they impinge upon the adhesive in an endwise manner whereby their ends are partially embedded in the wet adhesive film. Because the fibers all have like electrostatic charges thereon, they are repelled by each other and as they approach the screen move as far away as possible from the fibers already attached thereto so that each individual fiber will seek the largest available space on the adhesive-coated screen and all fibers will tend to be substantially uniformly spaced from each other. After the fibers have been attached to the screen, the wet adhesive is baked, dried or cured in any suitable manner.

The electrostatic charge on the fibers of flocking material may be applied by the action of the fibers themselves while circulating through the air stream, or an additional charge may be applied thereto by passing the fibers through an electric field. Of course the fibers of some flocking materials will pick up an electrostatic charge more readily than others. With materials which will not pick up a charge of sufficient strength, it is necessary to apply an additional charge by passing the fibers through an electric field created by any suitable means such as a Van de Graaf electrostaic generator. With the additional electrosttaic charge so applied to the fibers, endwise attachment thereof to available wet adhesive space is assured thus providing a uniformly distributed pattern of fibers on the screen at closely spaced points.

Endwise attachment of long fibrous flock material to a screen in the above manner is described and claimed in co-pending application Serial No. 701,578, filed December 9, 1957, and entitled, Flocked Screen and Method of Making the Same.

The adhesive used in this invention may be any of those which can be readily applied to the screen, preferably in a liquid state, so that conventional application by spraying, dipping, brushing or rolling is facilitated. The wet surface of the adhesive should be such that the fibers upon contact therewith may readily embed themselves therein so that the fibers are tightly secured when the adhesive is cured. Examples of suitable adhesives are paints, such as used on farm machinery, synthetic resins and plastics, varnishes, rubber-based adhesives and the like. The choice of adhesives in many cases will depend upon the service conditions to which the filter will be subjected.

As can be readily seen from the various embodiments of filter mediums disclosed herein, there is provided a wide range of choices and combinations of flock fiber lengths, screen sizes, and final dimensions and depth of filter which is produced very simply and at low cost.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A filtering medium comprising a planar meshed corrugated screen composed of rod-like members and having alternating ridges and furrows wherein the depth and width of said furrows is substantially greater than the cross-sectional area of individual ones of said rod-like members and a flocking material of individual fibers extending between the sides of said furrows to substantially completely fill up the furrows between said ridges on at least one side of the screen, said fibers being secured to said screen and in said furrows whereby a fibrous body is formed of predetermined depth and with a substantially continuous exposed surface.

2. The filtering medium of claim 1 wherein the individual fibers are randomly disposed in said furrows.

3. The filtering medium of claim 1 wherein the individual fibers are secured endwise on said screen, said fibers having a length of at least one half the largest dimension of the meshes in the screen and said fibers being substantially uniformly distributed on the screen.

4. The filtering medium defined in claim 1 wherein said fibers are substantially longer than the mesh of said screen whereby said fibers span said furrows between said ridges.

5. A filtering medium comprising a planar meshed corrugated screen having a plurality of parallel laterally spaced undulating runner wires having alternating ridges and furrows and a plurality of parallel laterally spaced cross-wires extending transversely to said runner wires and joined at their points of crossing of said runner wires wherein the depth and width of said furrows is substantially many times greater than the cross-sectional area of individual ones of said wires, a flocking material of individual fibers secured endwise on said screen, said fibers having a length of less than one half the smallest dimension of the meshes in the screen, and a flocking material of individual fibers having a length of at least one half the largest dimension of the meshes in the screen randomly secured to said endwise secured fibers and filling the furrows between said ridges on at least one side of the screen.

6. A filtering medium comprising a plurality of parallel laterally spaced planar undulating runner wires forming alternating ridges and furrows and a plurality of parallel laterally spaced straight cross-wires extending transversely of said runner wires and alternately connected thereto at said ridges and at the bases of said furrows to form a planar mesh screen structure wherein the depth and width of said furrows are uniform and substantially many times greater than the cross-sectional area of individual ones of said wires, and a flocking material of individual fibres secured to said mesh screen structure and filling up the furrows between sides of said furrows and said ridges.

7. The filtering medium as defined in claim 6 wherein said flocking material comprises substantially straight individual uniformly distributed fibers secured endwise on said cross-wires, said fibres having a length of at least one-half the largest dimension of the meshes in said screen structure so that the fibres secured to the cross-wires connected to adjacent ones of said ridges and the fibres at the base of furrows between adjacent ones of said ridges extend in overlapping relation into said furrows between the sides thereof.

8. The filtering medium as defined in claim 6 wherein screens are provided covering opposite sides of said mesh screen structure.

9. The filtering medium of claim 8 in which the screen covering opposite sides of said corrugated screen is a woven plastic cloth.

10. The filtering medium of claim 8 in which the screen covering opposite sides of said corrugated screen has smaller meshes than the meshes of said corrugated screen.

References Cited in the file of this patent

UNITED STATES PATENTS

| | | |
|---|---|---|
| 1,700,126 | Goodloe | Jan. 29, 1929 |
| 1,883,715 | Greene | Oct. 18, 1932 |
| 2,463,722 | Spraragen | Mar. 8, 1949 |
| 2,463,723 | Spraragen | Mar. 8, 1949 |
| 2,479,722 | Brixius | Aug. 23, 1949 |
| 2,619,188 | Haw et al. | Nov. 25, 1952 |
| 2,782,933 | Monsarrat | Feb. 26, 1957 |